US012689046B2

(12) United States Patent  
Meyer et al.

(10) Patent No.: US 12,689,046 B2  
(45) Date of Patent: Jul. 21, 2026

(54) SYSTEM FOR PROTECTING A FUEL CELL FROM COLD TEMPERATURES

(71) Applicant: FORD GLOBAL TECHNOLOGIES, LLC, Dearborn, MI (US)

(72) Inventors: Jason Meyer, Canton, MI (US); Rajit Johri, San Francisco, CA (US); Stanley L. Bower, Jr., Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 742 days.

(21) Appl. No.: 18/172,055

(22) Filed: Feb. 21, 2023

(65) Prior Publication Data

US 2023/0268526 A1     Aug. 24, 2023

Related U.S. Application Data

(60) Provisional application No. 63/312,344, filed on Feb. 21, 2022.

(51) Int. Cl.  
  *H01M 8/04*     (2016.01)  
  *H01M 8/04007*     (2016.01)  
  (Continued)

(52) U.S. Cl.  
  CPC ... *H01M 8/04253* (2013.01); *H01M 8/04007* (2013.01); *H01M 8/04225* (2016.02);  
  (Continued)

(58) Field of Classification Search  
  CPC ......... H01M 8/04253; H01M 8/04225; H01M 8/04302; H01M 8/04007; H01M 8/04231;  
  (Continued)

(56) References Cited

U.S. PATENT DOCUMENTS 9,034,532 B2   5/2015   Sung et al.  
9,358,900 B2   6/2016   Wake et al.  
(Continued)

FOREIGN PATENT DOCUMENTS

CN        112224093      1/2021  
DE      102013224604      6/2014  
(Continued)

*Primary Examiner* — James M Erwin

(74) *Attorney, Agent, or Firm* — David B. Kelley; Brooks Kushman P.C.

(57)        ABSTRACT

A protection system for a fuel cell is provided that has two different modes of operation. The protection system includes a fuel cell, a cooling system for the fuel cell that controls the temperature of the fuel cell responsive to a controller. The controller is operable in a first mode of operation when a time T for the next start-up is not known and a second mode of operation when the time T for the next start-up is known. In the first mode, a time $T_F$ is the time an estimated future ambient temperature is estimated to fall to near freezing wherein at $T_F$ the cooling system purges the fuel cell. In the second mode, at $T_F$ the cooling system turns on without starting the fuel cell. The controller turns of the cooling system when the fuel cell stack is warmed to a nominal temperature.

14 Claims, 2 Drawing Sheets

(51) Int. Cl.

| | |
|---|---|
| *H01M 8/04223* | (2016.01) |
| *H01M 8/04225* | (2016.01) |
| *H01M 8/04302* | (2016.01) |
| *H01M 8/0432* | (2016.01) |
| *H01M 8/04701* | (2016.01) |
| *H01M 8/04955* | (2016.01) |

(52) U.S. Cl.
CPC ... *H01M 8/04231* (2013.01); *H01M 8/04268* (2013.01); *H01M 8/04302* (2016.02); *H01M 8/0432* (2013.01); *H01M 8/04723* (2013.01); *H01M 8/04955* (2013.01); *H01M 2250/20* (2013.01)

(58) Field of Classification Search
CPC ........... H01M 8/04268; H01M 8/0432; H01M 8/04723; H01M 8/04955; H01M 2250/20
USPC ......................................................... 429/429
See application file for complete search history.

(56) References Cited

U.S. PATENT DOCUMENTS

| | | | | |
|---|---|---|---|---|
| 10,439,238 | B2 | 10/2019 | Riley et al. | |
| 2011/0200895 | A1* | 8/2011 | Sinha ................ | H01M 8/04835 |
| | | | | 429/413 |
| 2012/0251910 | A1* | 10/2012 | Matsumoto ....... | H01M 8/04231 |
| | | | | 429/429 |
| 2014/0322623 | A1* | 10/2014 | Ohgami ........... | H01M 8/04753 |
| | | | | 429/427 |
| 2015/0099200 | A1* | 4/2015 | Staley .................... | B60L 58/32 |
| | | | | 429/413 |
| 2018/0019485 | A1* | 1/2018 | Riley ................ | H01M 8/04231 |
| 2021/0376344 | A1 | 12/2021 | Toida et al. | |

FOREIGN PATENT DOCUMENTS

| | | |
|---|---|---|
| JP | 3891136 | 3/2007 |
| JP | 5114825 | 1/2013 |

* cited by examiner

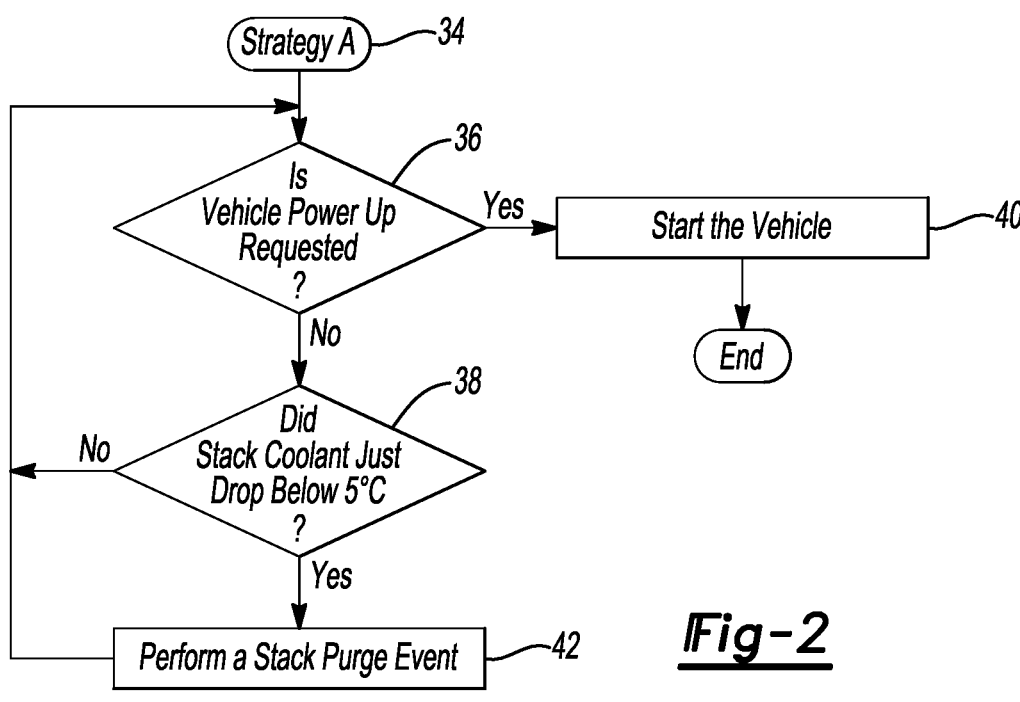
_Fig-2_
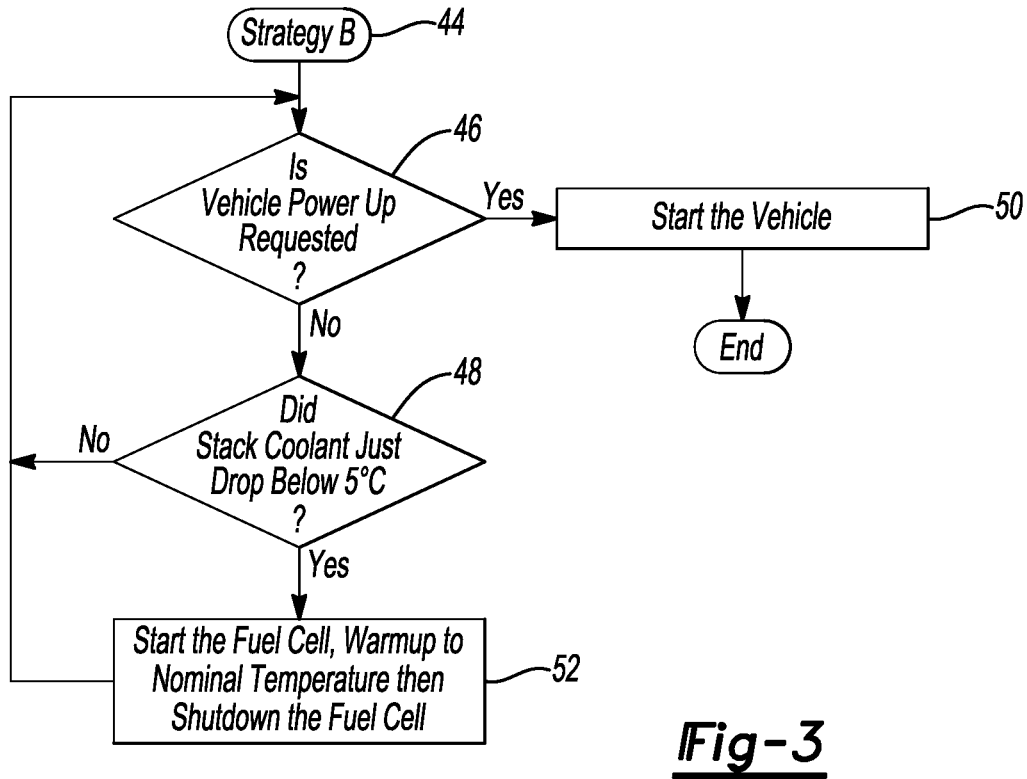
_Fig-3_

SYSTEM FOR PROTECTING A FUEL CELL FROM COLD TEMPERATURES

REFERENCE TO RELATED APPLICATIONS

This application claims the benefit of U.S. provisional application Ser. No. 63/312,344 filed Feb. 21, 2022, the disclosure of which is hereby incorporated in its entirety by reference herein.

TECHNICAL FIELD

This disclosure relates to fuel cells for vehicles and systems for protecting the fuel cell when shutdown in cold environments.

BACKGROUND

Vehicles powered by fuel cells have cooling systems that are used to cool the fuel cell while operating but when not operating may be affected by freezing or near freezing conditions.

A conventional system for protecting fuel cells when coolant temperature nearly reaches freezing (e.g. 5° C.) and blow air through the fuel cell stack to remove any water (a stack purge event). However, this process removes hydrogen protection from the fuel cell. Fuel cell starts without hydrogen protection cause more degradation than a normal hydrogen protected fuel cell start. There is a need to minimize the number of starts without hydrogen protection and with 18 t sacrificing vehicle fuel cell protection.

This disclosure is directed to solving the above problems and other problems as summarized below.

SUMMARY

According to one aspect of this disclosure, a system is provided for protecting a fuel cell in freezing and near freezing conditions. The system comprises a fuel cell, a cooling system for the fuel cell and a controller. The cooling system functions to control the temperature of the fuel cell preventing the fuel cell from over-heating when the fuel cell is operating and warming the fuel cell upon start-up. The controller as operated herein functions to heat the fuel stack when a time T for the next start-up is known and the time $T_F$ that an estimated future ambient temperature is estimated to fall to near freezing before T, at $T_F$ the cooling system is turned on without starting the fuel cell.

According to other aspects of this disclosure, the controller may be programmed to estimate the time $Y_1$ required for the fuel cell stack temperature to fall to near freezing. The controller may also estimate the time $Y_2$ required for the fuel cell stack to drop from fully warmed to near freezing. When T is less than the sum of $Y_1+Y_2$, the cooling system is turned on without starting the fuel cell.

In the protection system for a fuel cell, the controller may be operable in a second mode when the time T of the next start-up is not known, wherein when $T_F$ is estimated to fall to near freezing, at $T_F$ the cooling system purges the fuel cell. The cooling system may purge the fuel cell by blowing heated air through the through the fuel cell stack to remove water from the fuel cell stack.

In the protection system for a fuel cell $T_F$ may be based upon an input from a temperature sensor, a temperature data source, or a manual input from a user.

The controller may turn off the cooling system after the cooling system is turned on without starting the fuel cell and the coolant is warmed to a predetermined level.

According to a second aspect of this disclosure, a protection system for a fuel cell is provided that has two different modes of operation. The protection system includes a fuel cell, a cooling system for the fuel cell that controls the temperature of the fuel cell that is responsive to a controller. The controller is operable in a first mode of operation when a time T for the next start-up is not known and a second mode of operation when the time T for the next start-up is known. In the first mode, a time $T_F$ is the time an estimated future ambient temperature is estimated to fall to near freezing and at $T_F$ the cooling system purges the fuel cell. In the second mode, at $T_F$ the cooling system turns on without starting the fuel cell.

In the protection system for a fuel cell according to the second aspect of this disclosure, the controller may be programmed to estimate the time $Y_1$ required for the fuel cell stack temperature to fall to $T_F$, and estimate the time $Y_2$ required for the fuel cell stack to drop from fully warmed to $T_F$. In this case, when T is less than the sum of $Y_1+Y_2$, the cooling system may be turned on without starting the fuel cell.

In the protection system for a fuel cell according to the second aspect of this disclosure, the cooling system purges the fuel cell by blowing heated air through the through the fuel cell stack to remove water from the fuel cell stack.

In the protection system for a fuel cell according to the second aspect of this disclosure, $T_F$ may be based upon a temperature sensor, a temperature data source, or a manual input from a user.

According to a third aspect of this disclosure, a protection system for a fuel cell is provided for the fuel cell in conditions when ambient temperatures fall to near freezing. The system includes a fuel cell stack and a cooling system for the fuel cell that controls the temperature of the fuel cell stack when operating and warms the fuel cell stack for start-up. A controller is programmed to shut down the fuel cell stack when requested and store a predicted start-up time T and store an ambient temperature value. The controller estimates the time $Y_1$ required for the fuel cell stack temperature to fall to a selected near freezing fuel cell temperature and estimate the time $Y_2$ required for the fuel cell stack to drop from fully warmed to the selected near freezing fuel cell temperature. The controller is programmed to operate the cooling system when T known and $Y_1<T$ and $T<Y_1+Y_2$.

In the protection system for a fuel cell according to the third aspect of this disclosure, the controller is operable in a second mode when a time T of the next start-up is not known, the controller estimates the time $T_F$ that is an estimated time that an ambient temperature is estimated to fall to near freezing, wherein the cooling system purges the fuel cell.

In the protection system for a fuel cell according to the third aspect of this disclosure, the cooling system purges the fuel cell by blowing heated air through the through the fuel cell stack to remove water from the fuel cell stack.

In the protection system for a fuel cell according to the third aspect of this disclosure, $T_F$ may be estimated based upon one an input from a temperature sensor, a temperature data source, a manual input from a user.

The above aspects of this disclosure and other aspects will be described below with reference to the attached drawings.

BRIEF DESCRIPTION OF THE DRAWINGS

FIG. 2 is a flow chart illustrating protection strategy A wherein the fuel cell is protected by purging the fuel cell stack with heated air when the temperature falls to near freezing.

FIG. 3 is a flow chart illustrating protection strategy B wherein the fuel cell is protected by turning the cooling system on without starting the fuel cell when the temperature falls to near freezing.

DETAILED DESCRIPTION

Figure 1:
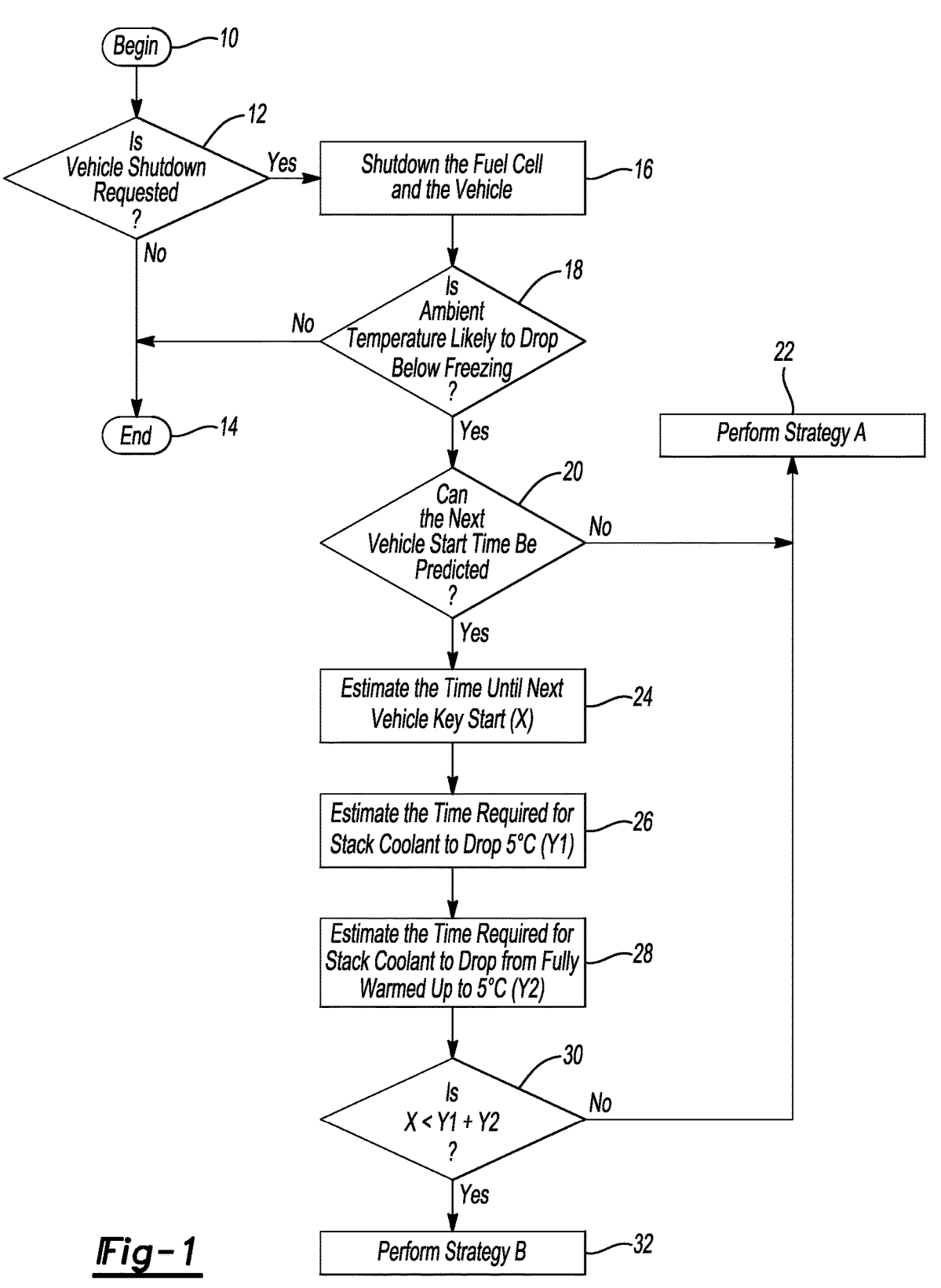
FIG. 1 is a flow chart illustrating the steps of one embodiment of the cold temperature protection system for a fuel cell in a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, the controller begins at 10. The initial decision at 12 made comprises is vehicle shutdown requested. If not, the routine ends at 14. If yes, the vehicle shuts down the fuel cell and the vehicle at 16. Next, a decision follows at 18—Is the ambient temperature likely to drop below freezing? If not, the routine ends at 14. If yes, the decision follows at 20—Can the next vehicle start time be predicted? If not, at 22 control strategy A described below with reference to FIG. 2 is initiated. If yes, at 24 the controller estimates the time until the next vehicle key start (X). The controller at 26 estimates the time $Y_1$ required for the stack coolant temperature to drop to near freezing (5°). The controller at 28 estimates the time $Y_2$ required for the stack coolant temperature to drop from fully warmed up to near freezing (5°). At 30 a decision is made as to whether the time until the next vehicle key start (X) is less than the sum of the time $Y_1$ required for the stack coolant temperature to drop to near freezing (5°) plus the time $Y_2$ required for the stack coolant temperature to drop from fully warmed up to near freezing (5°). If not, at 22 control strategy A is initiated. If yes, at 32 control strategy B described below with reference to FIG. 3 is initiated.

Referring to FIG. 2, a purge protection control strategy is illustrated beginning with the start of strategy A at 34. The decision is made at 36—Is vehicle power up requested? If not, at the further decision is made at 38—Did stack coolant drop below near freezing (5°). If not, the system returns to the beginning of strategy A.

If at 36 the decision is yes, the controller at 40 starts the vehicle.

If at 38 the decision is yes, the controller at 42 initiates a purge event by blowing heated air through the fuel cell stack to eliminate water from the fuel stack.

Referring to FIG. 3, control strategy B is illustrated beginning at 44. The decision is made at 46—Is vehicle power up requested? If not, at the further decision is made at 48—Did stack coolant drop below near freezing (5°). If not, the system returns to the beginning of strategy B.

If at 46 the decision is yes, the controller at 50 starts the vehicle.

If at 48 the decision is yes, the controller at 52 starts the fuel cell warming the fuel cell to a nominal temperature and then shuts down the cooling system. After warming the system returns to the beginning of strategy B.

In the broadest sense, the controller executes a time-based system for protecting a fuel cell in freezing and near freezing conditions (5°). The cooling system is controlled by the controller to heat the fuel stack when a time T for the next start-up is known and the time $T_F$ that an estimated future ambient temperature is estimated to fall to near freezing before T. At $T_F$ the cooling system is turned on without starting the fuel cell.

A dual mode protection system is provided wherein, the protection system includes a fuel cell, a cooling system for the fuel cell that controls the temperature of the fuel cell in response to the controller. The controller is operable in a first mode of operation when a time T for the next start-up is not known and a second mode of operation when the time T for the next start-up is known. In the first mode, a time TF is the time an estimated future ambient temperature is estimated to fall to near freezing and at TF the cooling system purges the fuel cell. In the second mode, at TF the cooling system turns on without starting the fuel cell.

The strategy implemented by the controller of the protection system for a fuel cell is implemented by at a request to shut down shut down the fuel cell stack storing a predicted start-up time T and storing a predicted ambient temperature value. The controller estimates the time $Y_1$ required for the fuel cell stack temperature to fall to a selected near freezing fuel cell temperature, and estimate the time $Y_2$ required for the fuel cell stack to drop from fully warmed to the selected near freezing fuel cell temperature. The controller is programmed to operate the cooling system when T known and $Y_1 < T$ and $T < Y_1 + Y_2$.

The controller may be operable in a conventional mode when the time T of the next start-up is not known, wherein when $T_F$ is estimated to fall to near freezing, at $T_F$ the cooling system purges the fuel cell. The cooling system may purge the fuel cell by blowing heated air through the through the fuel cell stack to remove water from the fuel cell stack.

In the protection system for a fuel cell $T_F$ may be based upon a temperature sensor in or near the fuel cell stack, a temperature data source such as a network weather forecast, or a manual input from a user entering the time expected for a predicted low temperature.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A protection system for a fuel cell comprising:
   a fuel cell stack;
   a cooling system for the fuel cell stack that controls a temperature of the fuel cell; and
   a controller operable when a time T for a next start-up is known and a time $T_F$ that an estimated future ambient temperature is estimated to fall to near freezing before T, at $T_F$ the cooling system is turned on without starting the fuel cell stack, wherein the controller is programmed to estimate a time $Y_1$ required for a fuel cell stack temperature to fall to near freezing, and estimate a time $Y_2$ required for the fuel cell stack to drop from fully warmed to near freezing, and wherein T must be less than sum of $Y_1 + Y_2$, before the cooling system is turned on without starting the fuel cell.

2. The protection system for a fuel cell of claim 1, wherein the controller is operable in a second mode when the time T of the next start-up is not known, wherein when $T_F$ is estimated to fall to near freezing, at $T_F$ the cooling system purges the fuel cell stack.

3. The protection system for a fuel cell of claim 2 wherein the cooling system purges the fuel cell stack by blowing heated air through the fuel cell stack to remove water from the fuel cell stack.

4. The protection system for a fuel cell of claim 1, wherein $T_F$ is selected from one of the following sources:
a temperature sensor;
a temperature data source; and
a manual input from a user.

5. The protection system for a fuel cell of claim 1, wherein the controller turns off the cooling system after the cooling system is turned on without starting the fuel cell stack and coolant is warmed to a predetermined level.

6. A protection system for a fuel cell comprising:
a fuel cell stack;
a cooling system for the fuel cell that controls a temperature of the fuel cell; and
a controller operable in a first mode of operation when a time T for a next start-up is not known and a second mode of operation when the time T for the next start-up is known, wherein in the first mode and a time $T_F$ is the time an estimated future ambient temperature is estimated to fall to near freezing, at $T_F$ the cooling system purges the fuel cell, and in the second mode at $T_F$ the cooling system turns on without starting the fuel cell, wherein the controller is programmed to estimate a time $Y_1$ required for a fuel cell stack temperature to fall to $T_F$, and estimate a time $Y_2$ required for the fuel cell stack temperature to drop from fully warmed to $T_F$, and wherein T must be less than a sum of $Y_1+Y_2$, before the cooling system is turned on without starting the fuel cell.

7. The protection system for a fuel cell of claim 6 wherein the cooling system purges the fuel cell by blowing heated air through the through the fuel cell stack to remove water from the fuel cell stack.

8. The protection system for a fuel cell of claim 6 wherein $T_F$ is based upon one of the following sources:

6 a temperature sensor;
a temperature data source; and
a manual input from a user.

9. A protection system for a fuel cell comprising:
a fuel cell stack;
a cooling system for the fuel cell that controls a temperature of the fuel cell stack when operating and warms the fuel cell stack for start-up, and
a controller programmed to—
shutdown the fuel cell stack when requested,
store a predicted start-up time T,
store an ambient temperature value;
estimate a time $Y_1$ required for the fuel cell stack temperature to fall to a selected near freezing fuel cell temperature,
estimate a time $Y_2$ required for the fuel cell stack to drop from fully warmed to the selected near freezing fuel cell temperature, and
start the cooling system when T is known and $Y_1<T$ and $T<Y_1+Y_2$.

10. The protection system for a fuel cell of claim 9, wherein the controller is operable in a second mode when the time T of the next start-up is not known, the controller estimates a time $T_F$ that is an estimated time that an ambient temperature is estimated to fall to near freezing, the cooling system purges the fuel cell.

11. The protection system for a fuel cell of claim 9 wherein the cooling system purges the fuel cell by blowing heated air through the through the fuel cell stack to remove water from the fuel cell stack.

12. The protection system for a fuel cell of claim 9 wherein $T_F$ is estimated based upon one of the following sources:
a temperature sensor;
a temperature data source; and
a manual input from a user.

13. The protection system for a fuel cell of claim 9 wherein the controller turns the cooling system off when a nominal temperature is reached.

14. The protection system for a fuel cell of claim 9 wherein the controller turns the cooling system off when $T<Y_1+Y_2$.

\* \* \* \* \*